No. 890,550. PATENTED JUNE 9, 1908.
E. V. ANDERSON.
VALVE FOR STAND PIPES, &c.
APPLICATION FILED APR. 4, 1906.

4 SHEETS—SHEET 1.

WITNESSES:

INVENTOR
Edward V. Anderson
by Christy and Christy
Atty

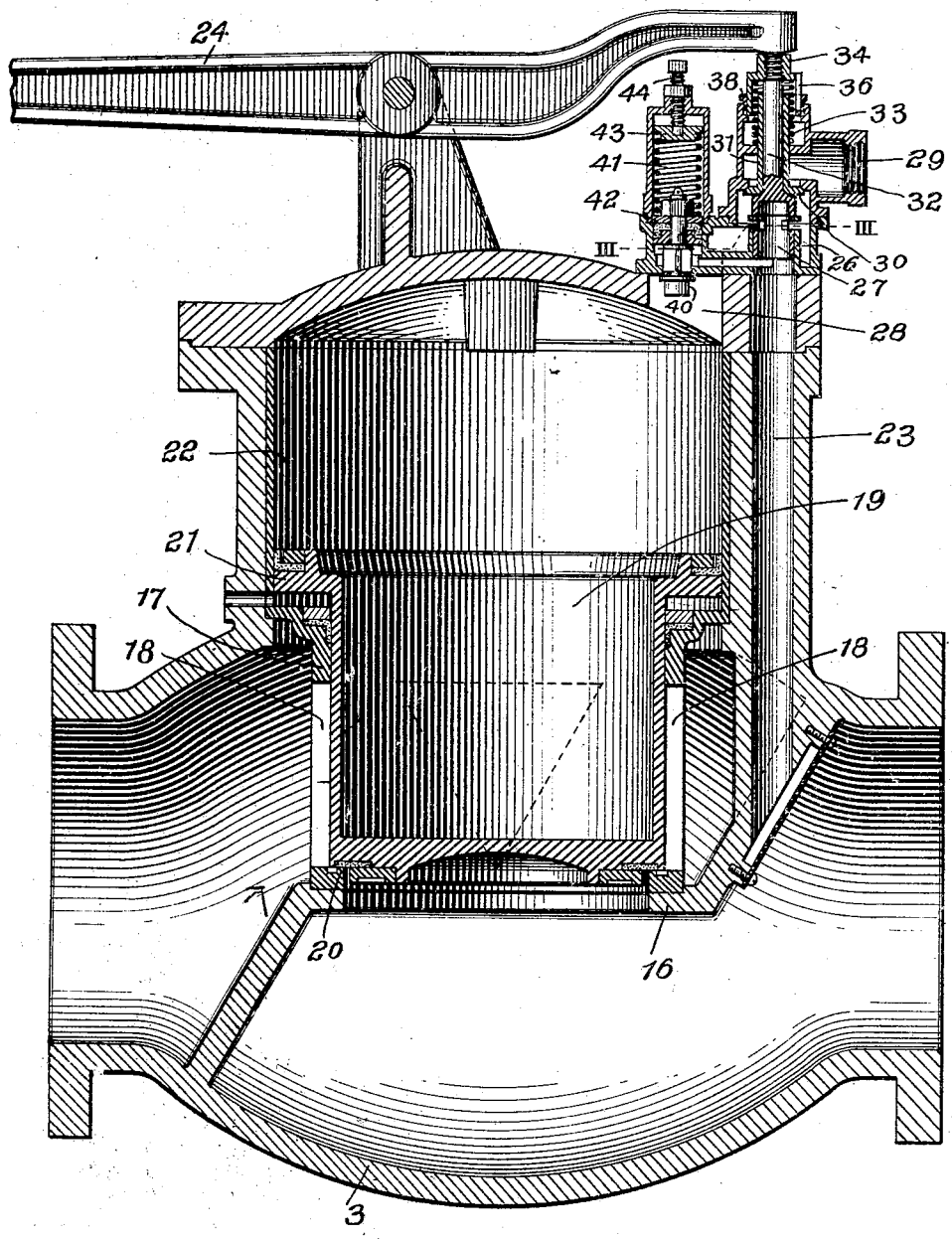

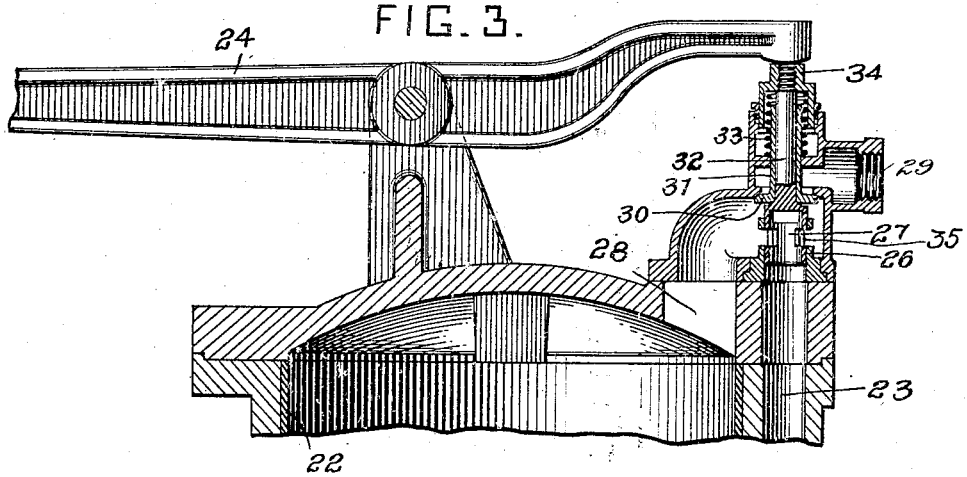
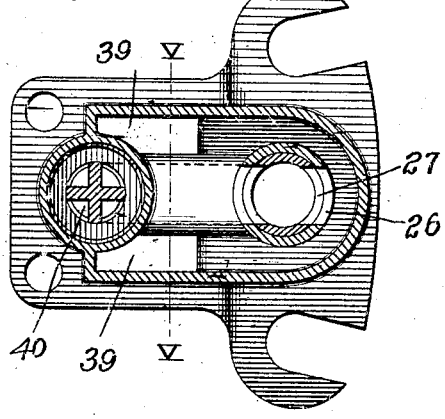
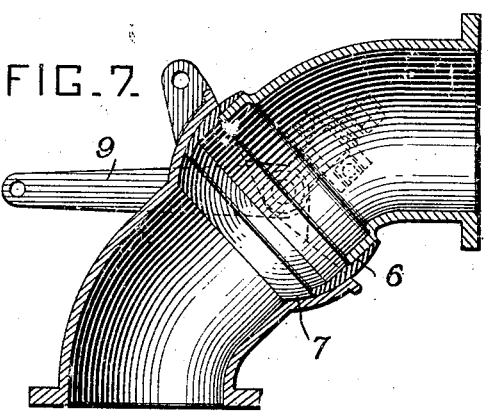
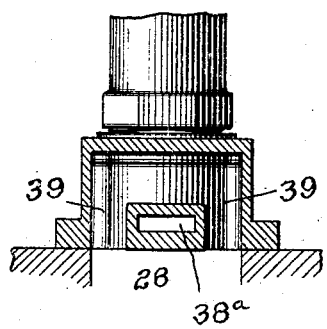
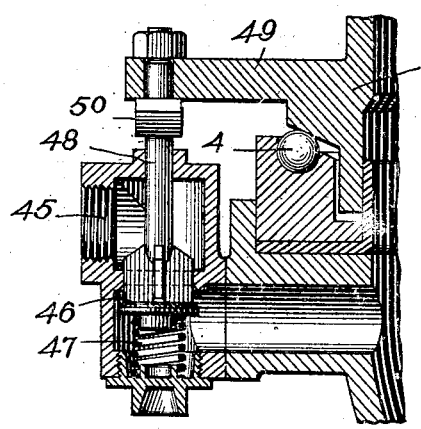

No. 890,550. PATENTED JUNE 9, 1908.
E. V. ANDERSON.
VALVE FOR STAND PIPES, &c.
APPLICATION FILED APR. 4, 1906.

4 SHEETS—SHEET 4.

WITNESSES:
J. Herbert Bradley.

INVENTOR
Edward V. Anderson
by Christy and Christy,
Atty's.

UNITED STATES PATENT OFFICE.

EDWARD V. ANDERSON, OF PITTSBURG, PENNSYLVANIA, ASSIGNOR OF ONE-HALF TO CHARLES E. GOLDEN, OF CRAFTON, PENNSYLVANIA.

VALVE FOR STAND-PIPES, &c.

No. 890,550.

Specification of Letters Patent.

Patented June 9, 1908.

Application filed April 4, 1906. Serial No. 309,898.

*To all whom it may concern:*

Be it known that I, EDWARD V. ANDERSON, residing at Pittsburg, in the county of Allegheny and State of Pennsylvania, a citizen of the United States, have invented or discovered certain new and useful Improvements in Valves for Stand-Pipes, &c., of which improvements the following is a specification.

Figure 1:
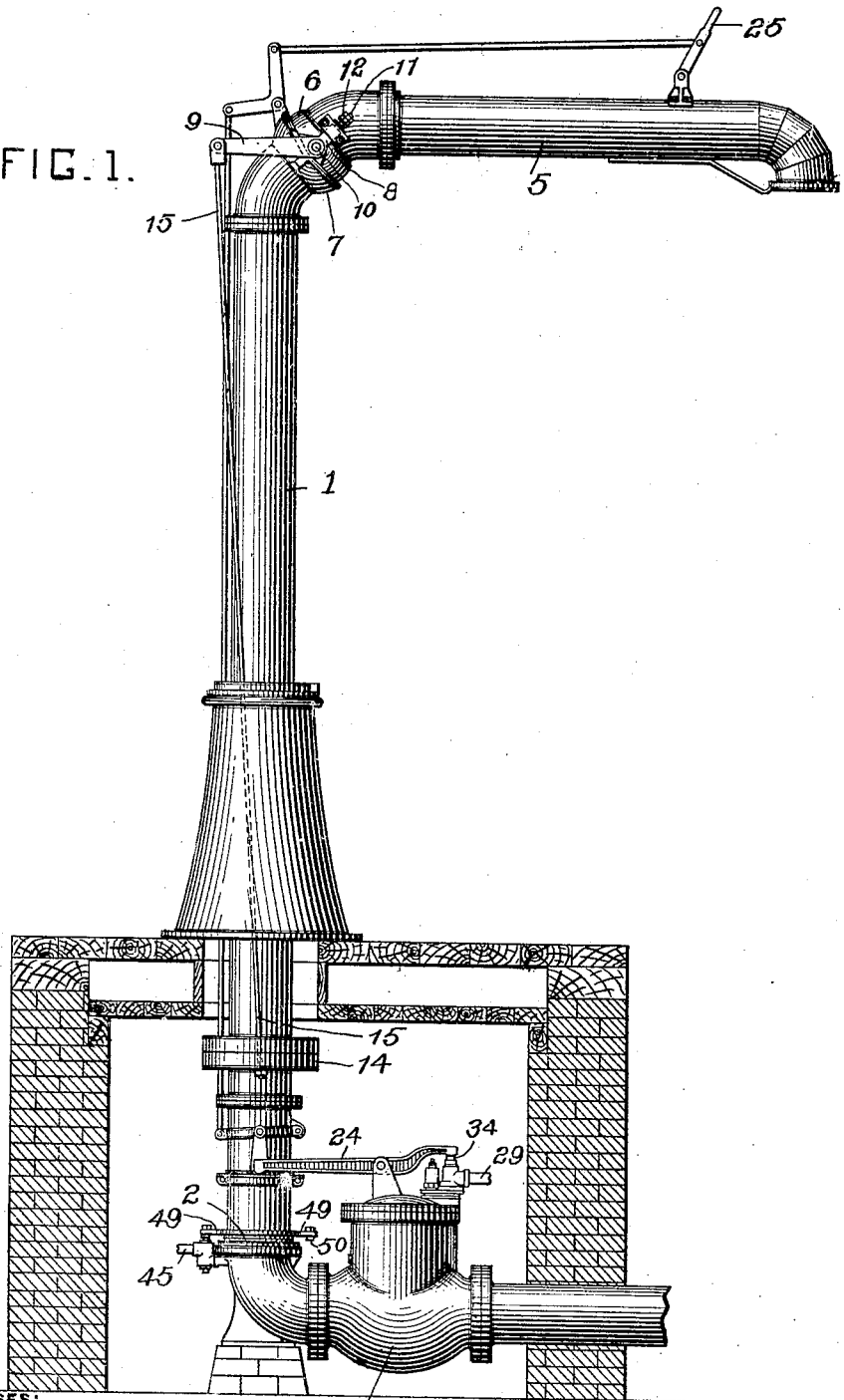
Figure 8:
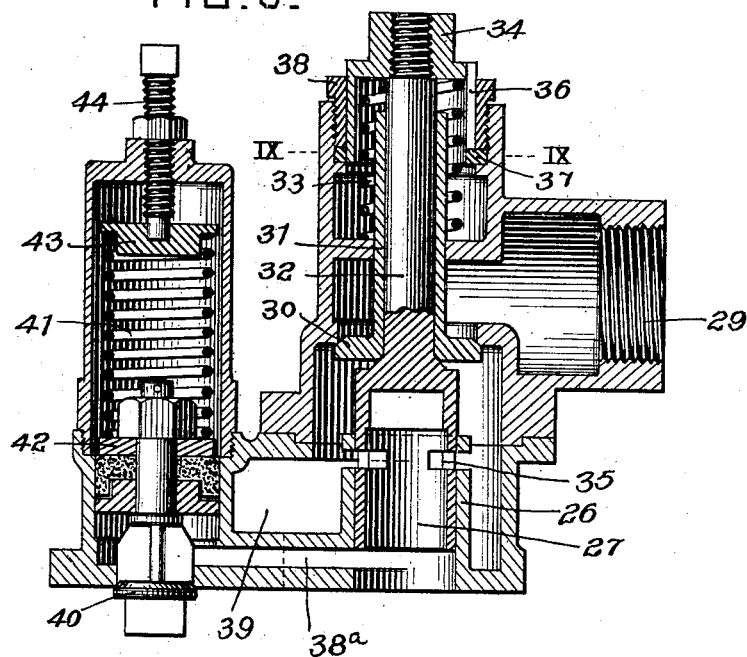
Figure 10:
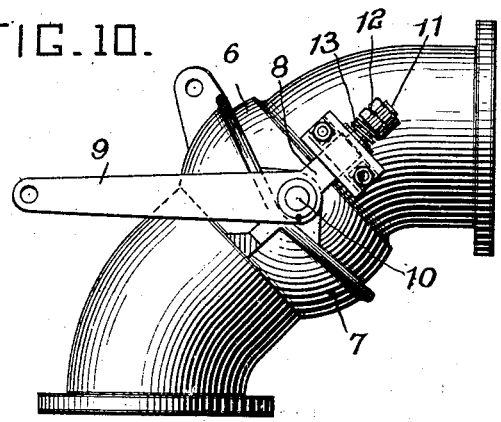
Figure 9:
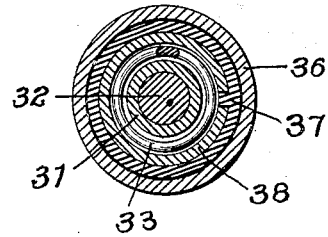

In the accompanying drawings forming a part of this specification Figure 1 is an elevation of my improved stand pipe; Fig. 2 is a sectional elevation on an enlarged scale of the regulating and controlling valve mechanisms; Fig. 3 illustrates a modification of the construction shown in Fig. 2; Fig. 4 is a sectional plan view on a plane indicated by the line III—III Fig. 2; Fig. 5 is a sectional view on a plane indicated by the line V—V Fig. 4; Fig. 6 is a sectional view of the drainage valve, and Fig. 7 is a sectional view of the joint between the horizontal and vertical arms of the stand pipe. Fig. 8 is a sectional elevation on an enlarged scale of the valve mechanisms controlling the flow of water to and from the main valve cylinder; Fig. 9 is a transverse section on a plane indicated by the line IX—IX Fig. 8 and Fig. 10 is a side elevation on an enlarged scale of the adjacent portions of the horizontal arm and the vertical stand pipe.

In the practice of my invention, the vertical portion 1 of the stand pipe has a seat or bearing 2 preferably formed on an elbow secured to the main valve casing 3. To facilitate the rotation of the vertical portion on its seat, anti-friction balls 4 are employed as shown in Fig. 6. The horizontal arm 5 is provided at its inner end with a bearing portion 6 formed integral with or secured on the horizontal portion. This bearing portion 6 has an external contour of a segment of a sphere and fits within a correspondingly shaped seat 7 on the vertical portion. This construction gives the horizontal arm a ball bearing on the vertical portion. As the seat 7 and the bearing 6 do not interlock one with the other, suitable means are provided for holding the bearing against its seat, in such manner as to form a tight joint therewith, and at the same time permit free up and down movement of the horizontal arm. A suitable construction for this purpose consists of links 8 pivotally connected to the vertical portion of the stand pipe and secured to the horizontal arm. In order to compensate for wear of the bearing or seat, the links are so attached to the parts they connect, that relative positions of said parts may be adjusted.

As in the construction shown the counterbalancing means as the weight, is connected to the horizontal arm through the links, the latter are formed integrally with or rigidly secured to the levers 9, which have bearings on the pivot pins 10, mounted in lugs on the vertical portion. The links are adjustably held between lugs on the horizontal arm 5 and are provided with threaded stems 11 for the reception of the adjusting nuts 12; springs 13 are interposed between the nuts and the seats for the links, so that the spherical bearing 6 is yieldingly held in the seat 7. The levers 9 are connected to any suitable counter balancing means as the annular weight 14, surrounding the vertical portion and connected to the lever by rods 15.

The valve casing 3 is provided with a diaphragm 16 having an opening therethrough for the passage of water. A cylinder 17 is arranged on the delivery side of the diaphragm, with its axis in alinement with the axis of the opening through the diaphragm. In the sides of this cylinder are formed openings 18, preferably V-shaped permitting the flow of water from the cylinder into the delivery side of the valve casing. A piston 19, preferably hollow, is arranged within this cylinder and serves to control and regulate the flow of water into and through the cylinder. The lower end of the piston bears when closed on an annular seat 20 surrounding the opening through the diaphragm, thereby stopping the flow of water. In its movement from and to closed position the piston traverses the V-shaped ports 18 so that there will be a gradual increase and decrease in the flow of water. It will be observed that this combined piston and valve, seats in opposition to the direction of flow of water to the stand pipe. Hence provision must be made to overcome the opening pressure exerted against the lower end of piston 19. To this end the piston 19 is provided at its upper end with a flange or enlargement 21 operative in an enlarged extension 22 of cylinder 17. This extension or second cylinder 22 is connected by passage 23 and valve mechanism hereinafter described with the inlet side of the valve casing 3, so that the same pressure will operate on both ends of the piston valve 19, but by reason of the greater area of the upper end of the piston, the latter will be shifted to close the port through the diaphragm.

The flow of water to and from the cylinder 22 is controlled by a valve mechanism shown in Figs. 2 and 3, said mechanism being operated to permit flow from the cylinder 22 by a lever 24, having suitable connections to an operating handle 25 arranged near the outer end of the horizontal arm 5. The valve mechanism consists of a tubular inlet 26 having one or more slots or ports in its side wall for flow of water. These ports are controlled by a cylindrical valve 27 fitting within or around the tubular inlet 26. In the construction shown in Fig. 3 the main chamber of the valve into which water flows from the tubular inlet is connected to a port 28 leading to the cylinder 22. The main chamber of the valve has an outlet port 29 controlled by a valve 30 having a tubular stem 31 through which passes the stem 32 of the valve 27. The valve 30 is held to its seat and the valve 27 is held with its ports in line with the inlet ports by a spring 33, which is preferably arranged between a diaphragm in the valve casing and a nut 34 on the stem 32. It will be observed that the valve 30 is carried by the valve 27 and said parts are so arranged that the valve 27 will be closed before the valve 30 is opened. This nut is formed with a cylindrical guiding portion fitting into recess in the valve casing. In the construction shown in Figs. 2, 3 and 8 provision is made for varying the flow through one of the ports in the tubular inlet. The port 35 is formed by slotting the inlet tube 26 as shown and the valve 27 is similarly slotted. When the valve is so adjusted that the slots or ports therein coincide exactly with ports 35 when brought into alinement vertically, the latter will have maximum delivery. By turning the valve on its axis the delivering capacity of the ports 35, even when the ports in the valve are in alinement therewith, will be reduced to any desired extent. In order to hold the valve in its adjusted position the guiding sleeve on the nut 34 has a groove 36 formed therein for the reception of a projection on a ring 37 fitting in the recess in the valve casing. This ring is clamped when adjusted by an externally threaded annular nut 38 screwing into the recess.

Where the water pressure is high it is necessary to regulate the flow of water into the cylinder 22 especially when pressure begins to increase, in order to prevent the piston valve from too hard an impact on its seat. To this end an automatic valve controlling the flow of the cylinder is employed. The tubular inlet 26 is provided with two ports controlled by the valve 27, the upper port 35 being adapted to have its area reduced by rotating the valve 27, as heretofore stated. The lower port in the tubular inlet is connected by a passage 38ª with the port 28 leading to cylinder 22, while the port 35 is connected with the cylinder by passages 39. The port 28 is controlled by a valve 40 normally held in open position by a spring 41 interposed between a movable head 42 to which the valve is connected and an abutment 43 to be shifted by an adjusting screw 44. When it is desired to close the piston valve, the valve 27 is depressed to open both ports in the tubular inlet, so that the cylinder 22 will fill rapidly. As soon as sufficient pressure has been attained to move the piston valve towards its seat, the valve 40 is closed, the spring 41 having been properly adjusted, thereby preventing the flow of water by the lower port in the tubular inlet and passage 38 into the cylinder. As the closing of the valve 40 does not check the flow of water entering by port 35 and passages 39, the closing of the piston valve will be completed by water entering the cylinder through such passages. The amount of water thus entering the cylinder can be regulated by adjusting valve 27 as stated. By this means the pressure in the cylinder 22 can be rapidly raised to any desired point, and thereafter gradually increased.

As the stand pipe might be injured by freezing of water therein, provision is made for the drainage of the vertical portion. To this end an outlet port 45 is provided at or near the lower end of the stand pipe as shown in Figs. 1 and 6. This port is controlled by a valve 46 pressed towards its seat by a spring 47. The valve is provided with a stem 48 projecting above the valve case. The vertical portion of the stand pipe is provided with an arm 49 carrying a cam plate 50. When the movable portion of the stand-pipe is shifted so that the horizontal arm is parallel with the track, the cam plate will bear on the stem 48 forcing the valve to open position thus permitting the escape of water. When the stand pipe is shifted so as to bring the horizontal arm over the track, the cam plate will move away from the stem and the valve will be closed by its spring 47.

I claim herein as my invention:

1. A valve mechanism for stand pipes, etc., having in combination a valve casing provided with a diaphragm having an opening therethrough, a cylinder in line with said opening and forming a portion of the waterway, a piston valve arranged in said cylinder and adapted to close the opening in the diaphragm, a by-pass connecting the cylinder with the supply, an adjustable valve for regulating and controlling the flow of water to the cylinder, a valve controlling the exhaust of water from the cylinder and means for shifting said valves to permit the flow of water to and from the cylinder.

2. A valve mechanism for stand pipes etc. having in combination a valve casing provided with a diaphragm having an opening therethrough, a cylinder in line with said opening and forming a portion of the waterway, a piston valve arranged in said cylinder and adapted to close the opening in the diaphragm, a by-pass connecting the cylinder with the supply, a valve having two outlet ports and controlling the flow of water to the cylinder, an automatic valve adapted to control the flow from one of the valve ports to the cylinder, and a valve controlling the exhaust of water from the cylinder.

3. A valve mechanism for stand pipes, etc. having in combination a valve casing provided with a diaphragm having an opening therethrough, a cylinder in line with said opening and forming a portion of the waterway, a piston valve arranged in said cylinder and adapted to close the opening in the diaphragm, a by-pass connecting the cylinder with the supply, a valve controlling the flow of water to the cylinder, an automatic valve for reducing the flow of water to the cylinder and a valve controlling the exhaust from the cylinder.

4. A valve mechanism for stand pipes, etc., having in combination a valve casing provided with a diaphragm having an opening therethrough, a cylinder in line with said opening and forming a portion of the waterway, a piston valve arranged in said cylinder and adapted to close the opening in the diaphragm, a by-pass connecting the cylinder with the supply, a valve having two ports leading to the cylinder, one of said ports being adjustable, an automatic valve controlling one of said ports, and a valve controlling the exhaust from the cylinder.

5. A valve mechanism for stand pipes etc. having in combination a valve casing provided with a diaphragm having an opening therethrough, a cylinder in line with said opening and forming a portion of the waterway, a piston valve arranged in said cylinder and adapted to close the opening in the diaphragm, a by-pass connecting the cylinder with the supply, an adjustable valve for regulating and controlling the flow of water to the cylinder and a valve controlling the exhaust of water from the cylinder and means for simultaneously shifting said valves, one to open and the other to closed position.

In testimony whereof, I have hereunto set my hand.

EDWARD V. ANDERSON.

Witnesses:
 WM. H. WILSON,
 CHARLES BARNETT.